United States Patent [19]

Catot et al.

[11] Patent Number: 5,527,079
[45] Date of Patent: Jun. 18, 1996

[54] METHOD FOR DETERMINING THE OUTLINE OF THE AXIAL SECTION OF A WHEEL AND WHEEL MADE THEREBY

[75] Inventors: Bernard Catot, Lefrinckoucke; Francois Demilly, Coudekerque, both of France

[73] Assignee: Valdunes, Puteaux, France

[21] Appl. No.: 271,999

[22] Filed: Jul. 8, 1994

[30] Foreign Application Priority Data

Jul. 9, 1993 [FR] France .................... 93 08518

[51] Int. Cl.$^6$ ................................. B60B 17/00
[52] U.S. Cl. ............................. 295/7; 295/31.1
[58] Field of Search ................. 295/1, 7, 31.1, 295/34, 21; 74/574

[56] References Cited

U.S. PATENT DOCUMENTS

| | | | |
|---|---|---|---|
| 994,350 | 6/1911 | Vial | 295/34 |
| 4,254,985 | 3/1981 | Kirschner | 295/7 |
| 4,294,482 | 10/1981 | Scheffel et al. | 295/31.1 X |

FOREIGN PATENT DOCUMENTS

| | | |
|---|---|---|
| 0050049 | 4/1982 | European Pat. Off. |
| 1926312 | 11/1970 | Germany. |
| 1605832 | 11/1970 | Germany. |
| 3243028C1 | 5/1984 | Germany. |
| 424701 | 2/1935 | United Kingdom. |
| 9008047 | 7/1990 | WIPO. |

*Primary Examiner*—Russell D. Stormer
*Attorney, Agent, or Firm*—Oblon, Spivak, McClelland, Maier & Neustadt

[57] ABSTRACT

In order to obtain, in service, a reduced acoustic emission, the position of the true point of contact (P) of the wheel with the rail is determined, the distribution of the masses of the section of the rim and of the wheel center of the wheel is adjusted so that the point of contact (P), the center of inertia (G1) of the section of the rim and the center of inertia (G2) of the section of the wheel center are located on one and the same straight line (XX') perpendicular to the axis (YY') and the outline of the section of the wheel is adjusted so that the point (P) is a vibration node for the axial vibration modes of the rim. The invention applies particularly to wheels for high-speed trains.

14 Claims, 1 Drawing Sheet

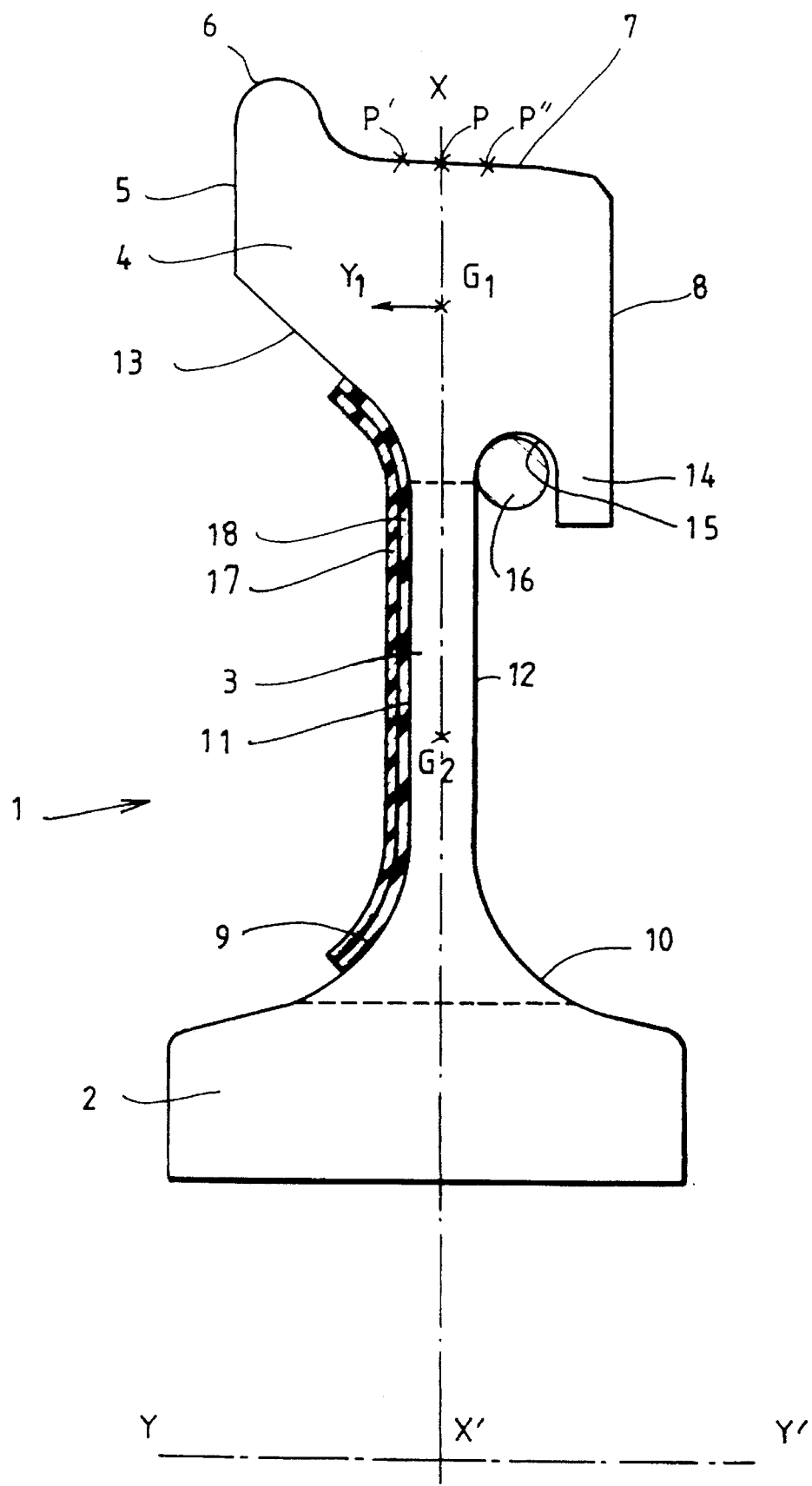

METHOD FOR DETERMINING THE OUTLINE OF THE AXIAL SECTION OF A WHEEL AND WHEEL MADE THEREBY

BACKGROUND OF THE INVENTION

1. Field of the Invention

The present invention relates to railway wheels with low acoustic emission.

2. Discussion of the Background

In contact with the rail on which it runs, a railway wheel is excited in vibration which causes it to emit a running noise, the power and frequency spectrum of which depend on the design of the wheel, on the finish of the contacting surfaces and on the speed of the train; in particular, for high-speed trains, the power of the noise emitted is very high and may reach 85 acoustic dB for speeds above 250 Km/h.

In fact, a railway wheel is a component intended for a specific application. For each application, the wheel is the subject of a specific design which takes account of the geometrical constraints, constraints of load per axle to be withstood and constraints of behavior under braking. However, constraints of acoustic emission are not taken into account, and this results in the wheels generally being very resonant.

In order to overcome this drawback, various techniques have been proposed which consist in locating resonators or dampers on the wheel, which interfere with the wheel, modify its natural vibrational frequencies, and decrease the acoustic emission.

These techniques exhibit the drawback of requiring fine adjustments of the resonators or of the dampers as a function of the natural frequencies of the wheel, and these natural frequencies vary each time the running surface is refreshed by machining. As a result, each wheel must be adjusted each time it is remachined.

In any case, these techniques are makeshift.

SUMMARY OF THE INVENTION

The object of the present invention is to propose a method for designing a wheel which takes account of its acoustic performances and which allows the wheel to be designed to be as least noisy as possible, for each application.

To this end, the subject of the invention is a method for determining the outline of the section through a plane passing through its axis of rotation of a vehicle wheel, and particularly of a railway wheel with low acoustic emission of the type comprising a hub, a wheel center and a rim forming a flange and a running surface, the shape of which is imposed, this wheel being intended to be used on a rail network made up of rails having a determined profile and laid according to regulations specific to the rail network, in which an optimized outline of the section of the wheel through the axial plane is determined on the basis of the load per axle of the vehicle, the nominal speed, and the braking conditions of the vehicle, characterized in that, in order to obtain, in service, an acoustic emission of the wheel which is as low as possible, the position on the running surface of the true point of contact P of the wheel with a rail, on which the wheel rests in service is determined on the basis of the imposed shape of the running surface, of the profile of the rail and of the conditions under which the rail was laid, the distribution of the masses of the section of the rim and of the wheel is adjusted so that the point of contact P, the center of inertia G1 of the section of the rim and the center of inertia G2 of the section of the wheel center are located on one and the same straight line XX' perpendicular to the axis YY' of the wheel, and in addition, the outline of the section of the wheel is adjusted so that the point P is a vibration node for the axial vibrational modes of the rim 4 of the wheel (1) in service.

In particular, the outline of the section of the rim may be adjusted so that the moment of inertia matrix of the section of the rim, calculated within a reference frame (G1X, G1Y1), of which the origin is situated at the center of inertia G1 of the section, of which the axis G1X is borne by the straight line XX' and the axis G1Y1 parallel to the axis YY' of the wheel, includes cross terms Ixy and Iyx less than 10% of each of the diagonal terms Ixx and Iyy. The results are better if the cross terms Ixy and Iyx are less than 3% of the diagonal terms Ixx and Iyy.

Preferably, an outline of the section of the wheel center is chosen which is symmetrical with respect to the straight line XX'.

It is also possible to adjust the outline of the section of the wheel center so that the moment of inertia matrix of the assembly formed by the section of the rim and the section of the wheel center includes cross terms Ixy and Iyx less than 10% and preferably less than 3% of the diagonal terms Ixx and Iyy.

The subject of the invention is also a railway wheel with low acoustic emission of the type comprising a hub, a wheel center and a rim equipped with a flange and with a running surface, in which, for any section through a plane passing through the axis of the wheel, the true point of contact of the running surface with a rail, the center of inertia of the section of the rim and the center of inertia of the section of the wheel center are aligned on a straight line XX' perpendicular to the axis of the wheel.

Preferably, the section of the wheel center is symmetrical with respect to the straight line XX', and better still the section of the wheel center is straight, that is to say that it is delimited by two straight lines substantially parallel to the straight line XX'.

Particularly, the section of the rim of the railway wheel may include a relief on the side of the inboard face of the wheel and a flyweight on the side of the outboard face of the wheel, the flyweight being formed integrally with the wheel or being attached thereto. The wheel center and the flyweight may then delimit a groove between them in which a ring, preferably made of stainless steel, may be placed.

In order to improve the acoustic performance of the wheel, a side piece may be bonded onto the wheel center by means of a resin; the running surface may also be roller-burnished.

Preferably, the moment of inertia matrix of the section of the rim includes cross terms Ixy and Iyx less than 10% and preferably less than 3% of the diagonal terms Ixx and Iyy.

BRIEF DESCRIPTION OF THE DRAWINGS

The invention will now be described with reference to the single appended FIGURE which represents the half section of a railway wheel through a plane passing through the axis of the wheel.

DESCRIPTION OF THE PREFERRED EMBODIMENTS

A railway wheel is an axisymmetric body generated by rotating a section 1 through an axial plane about an axis YY'.

The section 1 is divided into three parts: the section of the hub 2, the section of the wheel center 3, the section of the rim 4. The section of the rim 4 includes profiles corresponding to the internal face 5, to the flange 6, to the running strip 7 and to the outboard face 8 of the wheel.

For each application defined by a rail vehicle characterized by a given load per axle and which is to run at a fixed speed on a determined rail network using a specific braking technique, the person skilled in the art determines, in a known fashion, the section of the wheel so as to ensure sufficient mechanical strength, satisfactory behavior under braking and in general, a minimum weight for the wheel. In order to do that, he takes account of constraints specific to the particular problem, such as the shape of the flange and of the running surface, the diameter of the wheel, and uses calculation models which are, in themselves, known.

However, this design method does not take the acoustic behavior of the wheel into account. It does, however, leave enough degrees of freedom to optimize the acoustic behavior of the wheel.

In order to do that, the most probable true point of contact P of the running surface with the rail is determined, in a way which is in itself known to the person skilled in the art, taking account of the profile of the running surface, the profile of the rail and the regulations, specific to the rail network on which the wheel is intended to be used, under which the rail was laid. Then, during the design of the wheel, the condition is imposed that the point P, the center of inertia G1 of the section of the rim, and the center of inertia G2 of the section of the wheel center must be aligned on a straight line XX' perpendicular to the axis YY' of the wheel. This amounts to distributing the masses of the sections of the rim and of the wheel center so that the preceding condition is satisfied.

Finally, the outline of the section 4 of the rim is adjusted so that the point P is a node for the axial vibration modes (that is to say modes parallel to the axis YY') of the rim. In order to do that, one proceeds by trial and error either using models for calculating the vibrational behavior of a railway wheel which are, in themselves, known, or by experiment.

What is more, it is preferable to impose as a condition, that the moment of inertia matrix of the section 4 of the rim, calculated within the reference frame (G1X, G1Y1), of which the origin is the center of inertia G1 of the section 4 of the rim, of which the axes are parallel to the axes X'X and Y'Y, must be more or less diagonal, which means to say that the cross terms Ixy and Iyx are small by comparison with the diagonal terms Ixx and Iyy. In practice, the condition is imposed that Ixy and Iyx should be less than 10% of Ixx and Iyy.

The result is all the better if Ixy and Iyx are smaller; thus, it is preferable to impose that Ixy and Iyx should be less than 3% of Ixx and of Iyy; the ideal case being for Ixy and Iyx to be zero.

These constraints leave very little freedom for the choice of the shape of the section 3 of the wheel center and in particular of its neutral axis. However, it is preferable to choose a straight neutral axis borne by the straight line XX' and a shape for the section 3 of the wheel center which is symmetrical with respect to the straight line XX'.

In order to optimize the shape of the section 3 of the wheel center, the further condition may be imposed that the moment of inertia matrix of the assembly formed by the section 3 of the wheel center and the section 4 of the rim must be more or less diagonal, that is to say that the cross terms Ixy and Iyx must be less than 10%, and preferably less than 3% of the diagonal terms Ixx and Iyy.

By proceeding in this way, a wheel is obtained of which the acoustic emission is low. In effect, the running noise is brought about by the axial vibrations of the wheel center. Now, these vibrations are excited by the radial loads exerted on the point P by the rail/wheel contact and the design rules described are such that the coupling between radial excitation and axial vibrations is very low.

However, in the curved parts of the railway tracks, the vehicles are subjected to lateral loadings which move the point of contact P of the wheel with the rail to P' or P" (depending on whether the wheel is on the inside or the outside of the bend). So that the wheel should have satisfactory acoustic behavior not only in the straight line but also in curve, it is necessary to check that for excitations at P' and at P", the wheel has an acceptable vibrational behavior and, if necessary, to adjust the shape of the section of the rim and possibly of the section 3 of the wheel center, by trial and error.

This method has made it possible to design a wheel for a high-speed train, with low acoustic emission in which the most probable true point of contact P, the center of inertia G1 of the section 4 of the rim and the center of inertia G2 of the section 3 of the wheel center are aligned on a straight line XX' perpendicular to the axis YY' of the wheel. The section 3 of the wheel center is symmetrical with respect to XX' and straight, that is to say that apart from the blend radii 9 and 10 where they join onto the section 2 of the hub, the edges 11 and 12 of the section 3 are segments of straight lines parallel to XX'.

Apart from the profile of the flange 6, the running surface 7, the inboard face 5 and the outboard face 8, section 4 of the rim includes, on the side of the inboard face 5, a relief 13 which is inclined with respect to the straight line XX' and which joins the inboard face 5 to the wheel center, and on the side of the outboard face 8, a flyweight 14 which together with the wheel center 3 delimits a groove 15. The flyweight 14 which, on the wheel, constitutes an annulus, is formed integrally with the wheel, but it could be replaced by an attached flyweight fastened, for example, by screws.

In order to improve the acoustic behavior of this wheel, in particular, it is possible to place a stainless steel ring 16 in the groove 15, which reduces the squealing noises.

It is also possible to locate on the wheel center of the wheel, a side piece 17 which is bonded by a layer 18 of resin, for example of nepurane.

The present invention applies to any sort of railway wheel, and more generally may be adapted to the design of any land vehicle wheel.

We claim:

1. Method for determining the outline of the section through a plane passing through its axis of rotation (YY') of a vehicle wheel, and particularly of a railway wheel with low acoustic emission comprising a hub, a wheel center and a rim forming a flange and a running surface, this wheel being used on a rail network made up of rails having a determined profile and laid according to regulations specific to the rail network, in which an optimized outline of the section of the wheel through the axial plane is determined on the basis of the load per axle of the vehicle, the nominal speed, and the braking conditions of the vehicle, comprising the steps of:

determining the position on the running surface of the true point of contact (P) of the wheel with a rail, on which the wheel rests in service, on the basis of a shape of said running surface, of the profile of the rail and of the regulations specific to the rail network;

designing the outline of the section of the railway wheel so that the masses of the section of the rim and of the wheel center are distributed in such a way that the point of contact (P), the center of inertia (G1) of the section of the rim and the center of inertia (G2) of the section of the wheel center are located on one and the same straight line (XX') perpendicular to the axis (YY') of the wheel; and adjusting the outline of the section of the wheel so that the point (P) is a vibration node for the axial vibrational modes of the rim of the wheel in service.

2. Method according to claim 1, further comprising a step of adjusting the outline of the section of the rim so that the moment of inertia matrix of the section of the rim, calculated within a reference frame (G1X, G1Y1), of which the origin is situated at the center of inertia (G1) of the section, of which the axis (G1X) is borne by the straight line (XX') and the axis (G1Y1) parallel to the axis (YY') of the wheel, includes cross terms Ixy and Iyx less than 10% of each of the diagonal terms Ixx and Iyy.

3. Method according to claim 2, wherein the outline of the section of the rim is adjusted so that the cross terms Ixy and Iyx of the moment of inertia matrix are less than 3% of the diagonal terms Ixx and Iyy.

4. Method according to any one of claims 1 to 3, further comprising a step of defining an outline of the section of the wheel center which is symmetrical with respect to the straight line (XX').

5. Method according to claim 4, wherein the outline of the section of the wheel center is adjusted so that the moment of inertia matrix of the assembly formed by the section of the rim and the section of the wheel center, calculated within the reference frame (G1X, G1Y1), includes cross terms Ixy and Iyx less than 10% and preferably less than 3% of the diagonal terms Ixx and Iyy.

6. Railway wheel with low acoustic emission comprising a hub, a wheel center and a rim equipped with a flange and a running surface, wherein, for any section of the wheel, through a plane passing through the axis of rotation (YY') of the wheel, the true point of contact (P) of the running surface with a rail on which the wheel is resting in service, the center of inertia (G1) of the section of the rim and the center of inertia (G2) of the section of the wheel center are aligned on a straight line (XX') perpendicular to the axis (YY') of the wheel.

7. Railway wheel according to claim 6, wherein the section of the wheel center is symmetrical with respect to the straight line (XX').

8. Railway wheel according to claim 7, wherein the section of the wheel center is delimited by two straight lines substantially parallel to the straight line (XX').

9. Railway wheel according to claim 7 or claim 8, wherein the section of the rim includes a relief on the side of the inboard face of the wheel and a flyweight on the side of the outboard face of the wheel, the flyweight being formed integrally with the wheel or being attached thereto.

10. Railway wheel according to claim 9, wherein the flyweight and the wheel center delimit a groove between them.

11. Railway wheel according to claim 10, including a ring preferably made of stainless steel placed in the groove delimited by the flyweight and the wheel center.

12. Railway according to claim 6, further comprising a side piece bonded onto the wheel center by means of a resin.

13. Railway wheel according to claim 6, wherein the running surface is roller-burnished.

14. Railway wheel according to claim 6, wherein the moment of inertia matrix of the section of the rim, calculated within a reference frame (G1X, G1Y1), of which the origin is situated at the center of inertia (G1) of the section, of which the axis (G1X) is borne by the straight line (XX') and the axis (G1Y1) parallel to the axis (YY') of the wheel, includes cross terms Ixy and Iyx less than 10%, and preferably less than 3% of the diagonal terms Ixx and Iyy.

* * * * *